Aug. 26, 1941.                    A. G. EWERTH                    2,254,065
                                 SOWING MACHINE
                              Filed Nov. 19, 1938                 2 Sheets-Sheet 1
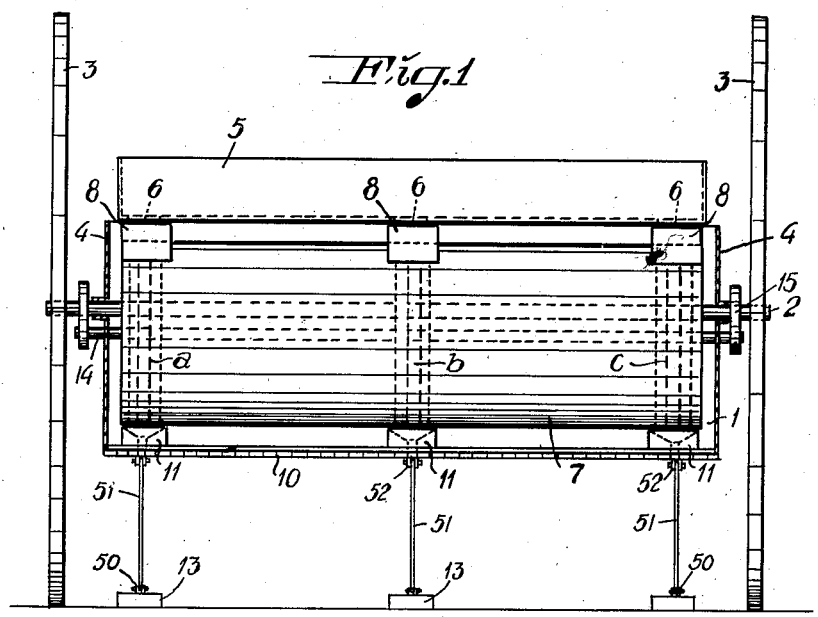
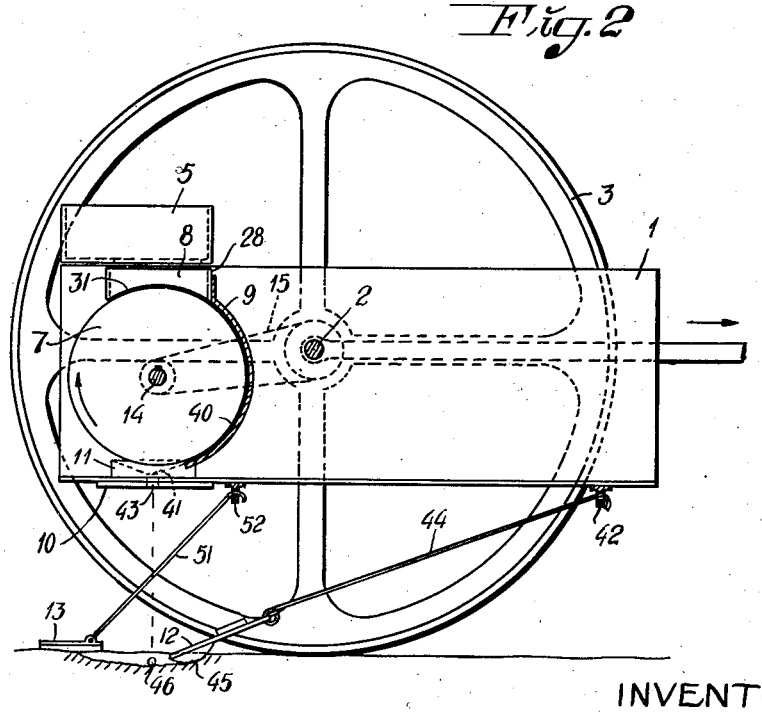
INVENTOR:
ANTON GEORG EWERTH
BY Haseltine, Lake & Co.
ATTORNEYS Aug. 26, 1941. A. G. EWERTH 2,254,065
SOWING MACHINE
Filed Nov. 19, 1938 2 Sheets-Sheet 2
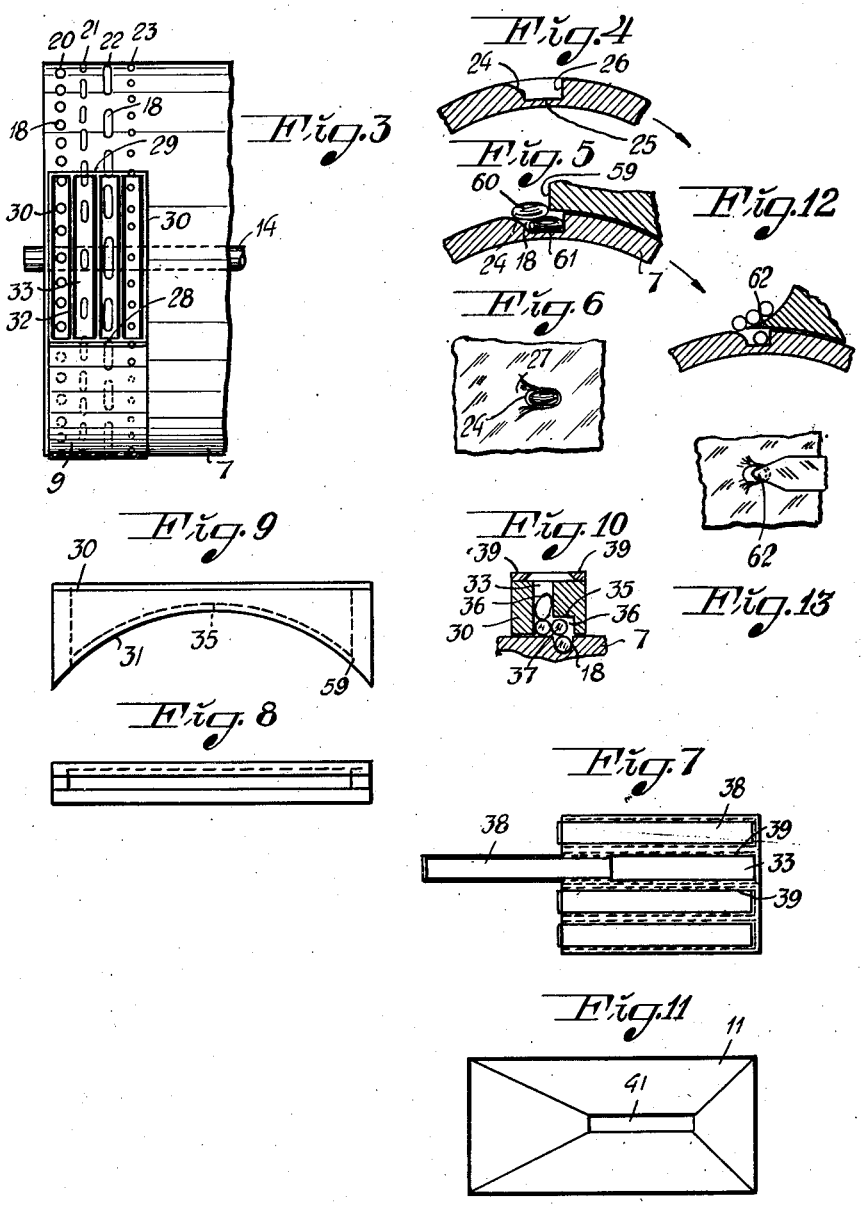
INVENTOR:
ANTON GEORG EWERTH
BY Haseltine, Lake & Co.
ATTORNEYS Patented Aug. 26, 1941

2,254,065

UNITED STATES PATENT OFFICE 2,254,065

SOWING MACHINE

Anton Georg Ewerth, Stocksund, Sweden, assignor to Erik Vilhelm Walter Hallwyl Von Geijer, Stockholm, Sweden Application November 19, 1938, Serial No. 241,304
In Sweden September 9, 1938

2 Claims. (Cl. 221—136)

The present invention relates to sowing machines of the type in which the corn or seed to be sown is fed from a supply to feed cells or indentations arranged in rows and each being adapted to receive and discharge the corn or seed singly.

Primarily, the object of the invention is to construct the feed means so as to enable one and the same sowing machine to be used at will for a great number of different kinds of corn or seed, the machine being adjustable in a simple way to sow corn or seed of different kind.

A further object of the invention is to construct the feed means so as to ascertain that the corn or seed is fed singly, the feeding operation taking place without injury of the grains.

Particularly, the invention aims at removing difficulties arising in feeding oblong grains in connection with receiving them in the feed cells, and particular steps have been taken to provide an adequate supply of the oblong grains to the holes.

Primarily, the invention consists in providing seed sowing machines of the type in which the grains to be sown are carried from a supply in rows of indentations of feed cells arranged around the periphery of a drum to receive and discharge the seed, having the arrangement in which the supply and the drum have mounted therebetween a feed housing which is divided into compartments separated from each other and each corresponding to a row of indentations and adapted to its particular kind of corn or seed, the breadth of each compartment being suited to this kind of corn or seed. The rows of feed cells or indentations may be provided around the periphery of a rotary drum in groups which are spaced apart in the longitudinal direction of the drum a medial distance equal to the distance between the drills or furrows to receive the seed. Each row of the group has its indentations suited to its particular kind of corn or seed. In each group the rows may be arranged in close proximity to each other, and due to the special form of the feed means it is possible to provide a relatively large number of different rows in each group so that the sowing machine may be used for a great number of different kinds of seed.

The feed compartments are in alignment with the corresponding rows of indentations and may have parallel or approximately parallel walls extending transversely of the drum.

Further features of the invention and advantages thereof will be clear from the following detail description of an embodiment of the invention, reference being had to the accompanying drawings in which—

Figure 1 is a diagrammatic assemblage view of the machine as looked from the rear thereof, partly in section;

Figure 2 is a side elevation corresponding to Figure 1 and likewise diagrammatic, one travelling wheel being removed;

Figure 3 is a plan view on a somewhat larger scale of one end of a feed drum and a feed housing positioned thereabove;

Figure 4 is a sectional view of a fragment of the surface of the feed drum on a still larger scale, the section being taken substantially on a plane at right angles to the axis of rotation of the drum;

Figure 5 is a similar view to Figure 4 and illustrates the operation where an indentation having two grains therein passes a striking-off element;

Figure 6 is a plan view of the fragment and the indentation shown in Figure 4;

Figure 7 is a plan view of a group of feed compartments and shutting means associated with a feed housing;

Figures 8 and 9 are a plan view and a side elevation respectively of a feed compartment shown in a larger scale, Figure 10 is a cross-sectional view of a feed compartment for oblong grains and shows the manner of feeding the grains into an indentation;

Figure 11 is a top view of a guide channel;

Figure 12 is a sectional view similar to Figure 5 but showing a modification; and Figure 13 is a plan view of said modification.

With reference to the drawings, the drill sowing machine shown diagrammatically therein (Figures 1 and 2) comprises a carriage having a frame 1 and an axle 2 which is rotatable together with the travelling wheels 3 and is journalled in the ends 4 of the frame, a seed box or hopper 5 carried by the frame 1 and having outlet openings 6 in the bottom thereof in a conventional manner, a feed drum 7, a number of feed housings 8 having guide plates 9 associated therewith, a protection bottom 10 having guide channels 11 positioned thereon, shares 12 (Figure 2), and a number of harrowing scrapers 13. The frame may be of any suitable construction and is shown only diagrammatically in the drawings.

The feed drum 7 is fixed to a shaft 14 carried in the ends 4 of the frame and driven at a speed which is dependent on the driving speed of the machine. To this end a chain transmission 15 may be arranged between the axle 2 of the travelling wheels and the shaft 14. The feed drum has, at the circumference thereof, rows of indentations 18 (Figures 3, 5, and 10) the shape and size of which suits to the grains of the kind of corn to be fed thereby. Each indentation may receive and retain only one grain at a time. The rows extend parallel to each other in planes at right angles to the axis of rotation of the drum 7. The rows are arranged in groups (a, b, c in Figure 1) spaced apart a medial distance equal to the distance between the drills in which the corn is to be sown, the rows of each group being supplied from a common feed housing 8.

Each row of the group consists of indentations suited to a special kind of corn, and the various kinds of rows are represented similarly in all groups of rows and in equal order laterally to each other. Figure 3 shows, by way of example, a group of four rows 20, 21, 22, 23, the row 20 of which may be contemplated for wheat, row 21 for rye, row 22 for oat, and row 23 for seed of root-crop. The rows in all the groups a, b, c, etc., are arranged similarly. As each row and the space between the rows needs a little width, a great number of rows may be arranged in each group so that one and the same machine may be used to feed a great number of different kinds of corn. All rows of same group are intended to discharge their corn in one and the same point, and the number of row groups a, b, c on the feed drum is equal to the number of shares 12 of the sowing-machine.

The longitudinal direction of the oblong indentations (21, 22) extends in the rotational direction of the feed drum 7. The rear edge 24 of each indentation is inclined to the bottom 25 of the indentation as shown in Figure 4 and extends tangentially to the surface of the feed drum 7. The forward edge 26, on the other hand, extends approximately at right angles to the surface of the drum. The oblique rear edge surface extends laterally and outwards from the indentation as illustrated by 27 (Figure 6). Said shape of the edge 24 is intended to facilitate sliding from the indentation other grains than that which has to remain therein.

The feed housings 8, the number of which is equal to that of the row groups a, b, c etc., have for their object to facilitate the supply of corn from the corn-box 5 to the feed drum. Each housing consists of a front wall 28 and a rear wall 29 and side walls 30 the tops of which are on the same level as those of the front and rear walls, the bottom edges 31 being arc-shaped and suited to the outer periphery of the drum (Figures 2 and 9). At the bottom of the inner side the front wall forms a striking-off edge 59 (Figures 5 and 9) for the purpose set forth hereinafter.

The feed housings are secured to the frame of the carriage in any suitable manner and are disposed in such relation to the sowing box 5 that the outlet openings 6 of the latter are situated thereabove. At the bottom the feed housings are open and have their bottom edges which are formed to suit to the feed drum close to the surface of the drum without touching it. Corn deposited into the feed housings may fall down on to the outer surface of the drum. The manner of disposing the feed housings above the feed drum is illustrated by Figures 1, 2 and 3.

The inner space of the feed housings is divided into compartments 33 by partitions 32 (Figure 3). The partitions 32 have their height, shape and position relatively to the corn box 5 as well as to the feed drum 7 equal to those of the outer side walls 30. The compartments 33 have consequently no communication with each other when the feed housing is in position on the feed drum 7. Each of the compartments 33 in a feed housing 8 is adapted to conduct the supply of corn to one feed row only, and the number of compartments in the feed housing is equal to the number of feed rows in the row group of the feed drum. Each compartment 33 is also intended for its particular kind of corn. The feed housing has such position above the feed drum that the compartment 33 intended for a certain kind of corn is in super-positioned alignment with that row of the feed drum intended for the corresponding kind of corn as shown in Figure 3.

The compartments 33 of the feed housings have their longitudinal direction disposed as that of the rows (20—23) and as that of the indentations for the oblong grains (in Figure 3 the indentations of the rows 21 and 22). The oblong grains are forced to take a position longitudinally to the indentations by the fact that the feed compartment is constructed with a free opening width suited thereto, i. e. a width which in any case is less than the length of the individual grains; furthermore, the compartment has parallel or approximately parallel walls.

It has also been found that oblong grains cannot be received surely by the indentations of the feed drum unless the grains are caused to take a lying position on the surface of the drum in the feed housing compartment. The compartments of the feed housings intended for feeding kinds of seed having oblong grains are therefore constructed so as to force the grains to lay themselves with their longitudinal axis substantially parallel to the tangential direction of the circumference of the drum during the passage of the grains through the compartment. For such purpose there is a guide surface 35 (Figure 10) spaced such a distance from the surface of the drum that the grains are impelled to take a position with their longitudinal axis parallel to the tangent of the drum surface to be able to pass between the drum surface and said guide surface. The guide surface 35 is formed by an upper surface parallel to the drum surface and confines a lateral chamber 36 in one side of the compartment, and the bottom of said lateral chamber is formed by a portion of the drum surface which has indentations. Figure 10 shows one grain 36 substantially standing in the feed compartment 33 proper, whereas the grain 37 which is forced beneath the guide surface 35 by the pressure of grains positioned above has been impelled to take a lying position.

The grains of certain kinds of corn may be received adequately in the indentations of the drum only when said indentations ascend whereas a reverse condition takes place for other kinds of corn. The feed housings are positioned so as to surround the feed drum by their lower arc-shaped portion to such an extent that the receipt of corn may occur at the ascending movement of the indentations as well as at the descending movement thereof, that is to say at both sides of the top point of the drum (see Figure 2).

The compartments of the feed housings which are contemplated for other kinds of seed than that to be sown on the occasion in question are shut from supply of corn from the corn box. To this end each compartment comprises a closing element at the top thereof. Such element may be constructed as a shutter or slide 38 guided by channelled ribs 39 on the top of the feed housing (Figures 7 and 10). Figure 7 shows a shutter 38 for a compartment 33 pulled out partly, the remainder of the shutters being closed. The shutter 38 may also be used to control the supply of corn to the feed compartment. At the front, i. e. at the wall 28 (Figures 2 and 3), the feed housing carries the guide plate 9 which surrounds the feed drum 7 partly. The object of the guide plate is to prevent the indentations from discharging the grains too early when the drum rotates. Without touching the feed drum the guide plate is extended close thereto so as to maintain grains introduced in the indentations during the rotation until they reach the point at which the guide plate terminates where they lose the support therefrom and descend.

The protecting bottom 10 which is arranged at the lower portion of the frame (Figures 1 and 2), has for its object to protect the feed drum 7 situated above from being damaged by stones or the like occurring in the ground, and to form a base for the guide channels 11.

The guide channels 11 (Figures 1, 2, and 11) have for their objects to catch the corn falling from the feed drum at the lower edge of the guide plate 9 and discharge the corn through an outlet slot 41 arranged in the bottom in alignment with a corresponding opening 43 in the protecting bottom 10 (Figure 2). The channels are therefore disposed on the protecting bottom below the row groups of the drum so as to be able to catch the corn falling down from the feed drum. At the top each guide channel has a width including one group of rows and enabling it to catch the seed from any of the rows in the group which is feeding on the occasion in question.

The object of the shares 12 (Figure 2) is to provide the drills in which to deposit the seed. They are suspended removably on a lower longitudinal front strip 42 at the frame by for instance rods 44 and are set in a position, one beneath each guide channel, as to be able to draw or open drills in alignment therebelow when the machine is driven. The shares 12 are further set so as to have their point of attack on the ground in close advance of the point 46 on which the corn falls. The shares may be of any suitable construction, but preferably they are constructed as described in the copending patent application Serial No. 220,172.

In case of certain kinds of seed such as beet seed the individual grains have a tendency of adhering to each other. To facilitate the separation of such grains in an indentation of the feed drum from the grains positioned thereabove the striking-off edge at the front wall of the feed compartment may be provided with a wedge-shaped point 62 directed rearwardly (reversely to the direction of rotation of the drum), thus separating the grains and allowing only one grain to remain in the indentation (Figures 15 and 16).

The operation of the sowing machine is as follows:

Corn filled in the corn box 5 descends through the feed housings 8 on to the feed drum 7. When the drum is rotated after starting the machine the grains drag on the surface thereof and are received successively in the indentations. Only one grain can remain in each indentation. If two grains should be carried along by an indentation, the upper grain 60 (Figure 5) will be forced out of the indentation when the latter passes the striking-off edge 59 formed by the front wall 28 of the feed housing. Due to the inclination of the rear edge surface 24 and the smooth extension to the peripheral surface of the drum the grain will not be damaged during the movement but slides easily out of the indentation, whereas the lower grain 61 on the bottom of the indentation may not be reached by the striking-off edge 59 and thus remains. The grains maintained in the indentations are carried by the feed drum inside the guide plate 9 to the lower side of the drum and descend from the lower edge of the plate 9 into the channels 11, through the outlet slots 41 from which they are deposited in the furrows opened by the shares and are then harrowed by the scrapers 13.

What I claim is:

1. In a sowing machine, the combination of a supply container for corn or seed, a rotatable drum having one or more rows of indentations for feeding the corn or seed, for each row a feed compartment to guide the corn or seed from said supply to said drum, a lateral chamber in said compartment and a guide surface forming an outer or upper side of said chamber and spaced from the periphery of the drum, whereby oblong grains of corn or seed having a length greater than the distance between the guide surface and the periphery of the drum will be impelled to take lying position on the surface of the drum.

2. In a sowing machine, the combination of a corn or seed supply, a rotatable drum, groups of indentation rows in said drum for feeding various kinds of corn or seed singly, a feed housing for each group to conduct the corn or seed from the supply to the drum, compartments in said housing having their longitudinal direction disposed in the direction of rotation of the drum, and one compartment having a wedge-shaped point fixed at the inner front wall of the compartment adjacent to the drum and directed against the direction of rotation of the drum to separate the grain received in an indentation from the grains situated above.

ANTON GEORG EWERTH.